US012423618B2

(12) United States Patent
Hsu et al.

(10) Patent No.: US 12,423,618 B2
(45) Date of Patent: Sep. 23, 2025

(54) FEDERATED LEARNING SYSTEM USING SYNONYM

(71) Applicants: Inventec (Pudong) Technology Corporation, Shanghai (CN); INVENTEC CORPORATION, Taipei (TW)

(72) Inventors: Chih-Fan Hsu, Taipei (TW); Wei-Chao Chen, Taipei (TW); Ming-Ching Chang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 825 days.

(21) Appl. No.: 17/697,104

(22) Filed: Mar. 17, 2022

(65) Prior Publication Data

US 2023/0289653 A1    Sep. 14, 2023

(30) Foreign Application Priority Data

Mar. 9, 2022 (CN) .......................... 202210232854.7

(51) Int. Cl.
*G06N 20/00* (2019.01)
(52) U.S. Cl.
CPC .................. *G06N 20/00* (2019.01)
(58) Field of Classification Search
CPC ....................................... G06N 20/00
See application file for complete search history.

(56) References Cited

U.S. PATENT DOCUMENTS

2021/0117780 A1* 4/2021 Malik .................. G06F 16/9536
2023/0316127 A1* 10/2023 Ward ...................... H04L 9/008
706/12

OTHER PUBLICATIONS

Arun, "Understanding Federated Learning", published Oct. 6, 2020 to https://towardsdatascience.com/understanding-federated-learning-99bc86a0d026, retrieved Feb. 3, 2025. (Year: 2020).*

(Continued)

*Primary Examiner* — Shourjo Dasgupta
(74) *Attorney, Agent, or Firm* — Troutman Pepper Locke LLP; Tim Tingkang Xia, Esq.

(57) ABSTRACT

A federated learning system using synonym includes a moderator and a plurality of clients. Each client includes an encoder encoding private data into a digest. The client trains a client model according to the private data, the digest and a general model, and sends the digest and a client parameter of the client model to the moderator. The moderator communicably connected to every client includes a synonym generator, sends the general model to every client, and determines an absent client of the plurality of client. The synonym generator generates a synonym of the digest corresponding to the absent client. The moderator trains a replacement model according to the synonym and the digest corresponding to the absent client device, performs an aggregation to update the general model according to a replacement parameter of the replacement model and the client parameter of every client except the absent client.

10 Claims, 12 Drawing Sheets

(56) References Cited

OTHER PUBLICATIONS

Nasroon Cheong, "Design a federated learning system in seven steps", published Oct. 26, 2021 to https://medium.com/towards-data-science/design-a-federated-learning-system-in-seven-steps-d0be641949c6, retrieved Feb. 3, 2025. (Year: 2021).*

"Federated Learning: The Shift from Centralized to Distributed On-Device Model Training", published Feb. 20, 2022 to https://www.altexsoft.com/blog/federated-learning, retrieved Feb. 3, 2025. (Year: 2022).*

Wei Huang, etc., "Fairness and Accuracy in Federated Learning", published via arXiv on Dec. 18, 2020, retrieved Feb. 3, 2025. (Year: 2020).*

Vasiliki Kelli, etc., "IDS for Industrial Applications: A Federated Learning Approach with Active Personalization", published Oct. 11, 2021 in Sensors 2021, vol. 21, p. 6743, retrieved Feb. 3, 2025. (Year: 2021).*

Sin Kit Lo, etc., "FLRA: A Reference Architecture for Federated Learning Systems", published to arXiv on Jun. 22, 2021, retrieved Feb. 3, 2025. (Year: 2021).*

Mi Luo, etc., "No Fear of Heterogeneity: Classifier Calibration for Federated Learning with Non-IID Data", published via 35th Conference on Neural Information Processing Systems, 2021, retrieved Feb. 3, 2025. (Year: 2021).*

Brendan McMahan, etc., "Federated Learning: Collaborative Machine Learning without Centralized Training Data", published on Apr. 16, 2017 to https://research.google/blog/federated-learning-collaborative-machine-learning-without-centralized-training-data, retrieved Feb. 3, 2025. (Year: 2017).*

Jonatan Reyes, etc., "Precision-Weighted Federated Learning", published to arXiv on Jul. 20, 2021, retrieved Feb. 3, 2025. (Year: 2021).*

Sergio Sanchez-Martinez, etc., "Machine Learning for Clinical Decision-Making: Challenges and Opportunities in Cardiovascular Imaging", published on Jan. 4, 2022 to to Frontiers in Cardiovascular Medicine, vol. 8, article 765893, retrieved Feb. 3, 2025. (Year: 2022).*

Lixu Wang, etc., "Addressing Class Imbalance in Federated Learning", published via The Thirty-Fifth AAAI Conference on Artificial Intelligence, 2021, retrieved Feb. 3, 2025. (Year: 2021).*

Xin Yao, etc., "Continual Local Training for Better Initialization of Federated Models", published to arXiv on May 26, 2020, retrieved Feb. 3, 2025. (Year: 2020).*

Ke Zhang, etc., "Subgraph Federated Learning with Missing Neighbor Generation", published via 35th Conference on Neural Information Processing Systems, 2021, retrieved Feb. 3, 2025. (Year: 2021).*

Xu Zhou, etc., "Federated conditional generative adversarial nets imputation method for air quality missing data", published in Knowledge-Based Systems, vol. 228, p. 107261, Sep. 2021, retrieved Feb. 3, 2025. (Year: 2021).*

Kallista Bonawitz, etc., "Federated Learning and Privacy", published to acmqueue, Sep.-Oct. 2021, pp. 87-114, retrieved Aug. 7, 2025. (Year: 2021).*

Shuang Dai, etc., "Addressing modern and practical challenges in machine learning: A survey of online federated and transfer learning", published on Feb. 7, 2022 to arXiv, retrieved Aug. 7, 2025. (Year: 2022).*

Han Cha, etc., "Federated Reinforcement Distillation with Proxy Experience Memory", published on Apr. 13, 2020 to arXiv, retrieved Aug. 7, 2025. (Year: 2020).*

Nguyen Truong, etc., "Privacy preservation in federated learning: An insightful survey from the GDPR perspective", published online Jul. 17, 2021 via Computers & Security, 2021, retrieved Aug. 7, 2025. (Year: 2021).*

Eugene Kuznetsov, etc., "SecureFL: Privacy Preserving Federated Learning with SGX and TrustZone", published via SEC '21, Dec. 14-17, 2021, San Jose, CA, USA, retrieved Aug. 7, 2025. (Year: 2021).*

Valentin Hartmann, etc., "Privacy-Preserving Classification with Secret Vector Machines", published on Aug. 19, 2020 to arXiv, retrieved Aug. 7, 2025. (Year: 2020).*

Tao Lin, etc., "Ensemble Distillation for Robust Model Fusion in Federated Learning", published on Mar. 27, 2019 to arXiv, retrieved Aug. 7, 2025. (Year: 2019).*

Jessica Chia Liu, etc., "Learning From Others Without Sacrificing Privacy: Simulation Comparing Centralized and Federated Machine Learning on Mobile Health Data", published via JMIR Mhealth Uhealth 2021;9(3):e23728, retrieved Aug. 7, 2025. (Year: 2021).*

Jin Wang, etc., "Federated Ensemble Model-based Reinforcement Learning", published on Sep. 12, 2021 to arXiv, retrieved Aug. 7, 2025. (Year: 2021).*

* cited by examiner

FEDERATED LEARNING SYSTEM USING SYNONYM

CROSS-REFERENCE TO RELATED APPLICATIONS

This non-provisional application claims priority under 35 U.S.C. § 119(a) on Patent Application No(s). 202210232854.7 filed in China on Mar. 9, 2022, the entire contents of which are hereby incorporated by reference.

BACKGROUND

1. Technical Field

The present disclosure relates to federated learning, and more particularly to a federated learning system using synonym.

2. Related Art

Federated Learning (FL) addresses many privacy and data sharing issues through cross-device and distributed learning via central orchestration. Existing FL systems mostly assume a collaborative setting among clients and can tolerate temporary client disconnection from the moderator.

In practice, however, extended client absence or departure can happen due to business competitions or other non-technical reasons. The performance degradation can be severe when the data are unbalanced, skewed, or non-independent-and-identically-distributed (non-IID) across clients.

Another issue arises when the moderator needs to evaluate and release the model to the consumers. As private client data are not accessible by the moderator, the representative data would be lost when clients cease to collaborate, resulting in largely biased FL gradient update and long-term training degradation. The naive approach of memorizing gradients during training is not a suitable solution, as gradients become unrepresentative very quickly as iteration progresses.

SUMMARY

Accordingly, the present disclosure provides a federated learning system using synonym. This is a FL framework that can address client absence by synthesizing representative client data at the moderator.

According to an embodiment of the present disclosure, a federated learning system using synonym includes a plurality of client devices and a moderator. Each of the plurality of client devices includes a first processor and a first communication circuit. The first processor is configured to execute an encoder. The encoder removes a private portion of private data and encodes the private data into a digest, and the first processor further trains a client model according to the private data, the digest and a general model. The first communication circuit is electrically connected to the first processor, and is configured to transmit the digest and a client parameter of the client model. The client parameter is associated with a weight of the client model. The moderator is communicably connected to each of the plurality of client devices. The moderator includes a second communication circuit and a second processor. The second communication circuit is configured to send the general model to each of the plurality of client devices. The second processor is electrically connected to the second communication circuit, and is configured to determine an absent client device among the plurality of client devices and execute a synonym generator. The synonym generator generates a synonym of the digest corresponding to the absent client device. The second processor further trains a replacement model according to the synonym and the digest corresponding to the absent client device, and performs an aggregation to generate an updated parameter to update the general model according to a replacement parameter of the replacement model and the client parameter of each of the plurality of client devices except the absent client device.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The detailed description of the embodiments of the present disclosure includes a plurality of technical terms, and the following are the definitions of these technical terms:

Client, the endpoint that contributes the data to join a distributed training or federated learning, also called "client device".

Moderator, the service provider that collects the models from the clients to aggregate a general model for providing the service.

Private data, the data that are held by a client and need to be protected.

Digest, a sharable representation that can represent the private data. No privacy concerns are included in the digest. The dimension of the digest is usually but not limited to lower than the private data.

Synonym, an alternative representation of private data without privacy concerns. The domains of the synonym and the private data are usually the same.

Client model, the model owned by each client.

Server model, the model owned by the moderator that is aggregated from the client models.

Stochastic Gradient Decent (SGD), an optimization process to update the parameters of a machine learning model based on predefined loss functions.

Federated learning (FL), a collaborative training framework to train a machine learning model without sharing client data to protect the data privacy.

Machine learning, a field of study that gives computers the ability to learn without being explicitly programmed.

Loss function: the objective functions of the optimizing process for training a machine learning model.

The present disclosure proposed a federated learning system using synonym and a federated learning method using synonym.

Figure 1:
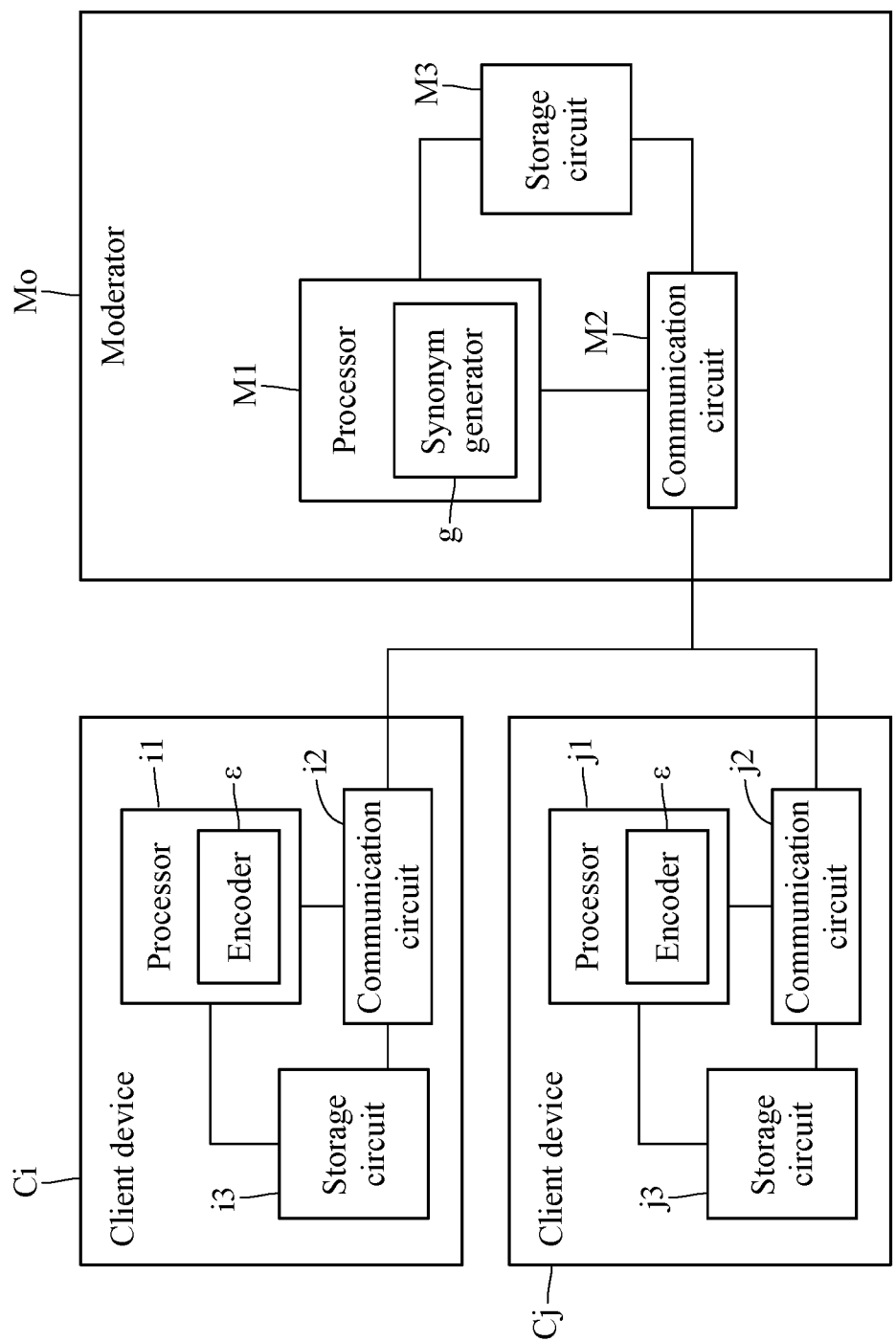
FIG. 1 is a block diagram of the federated learning system using synonym according to an embodiment of the present disclosure.

FIG. 1 is a block diagram of the federated learning system using synonym according to an embodiment of the present disclosure. As shown in FIG. 1, the federated learning system includes a moderator Mo and a plurality of client devices Ci, Cj. The moderator is communicably connected to each of the plurality of client devices Ci, Cj. In an embodiment, one of the following devices may be employed as the moderator Mo or the client devices Ci, Cj: a server, a personal computer, a mobile computing device, and any electronic device for training a machine learning model.

The moderator Mo includes a processor M1, a communication circuit M2, and a storage circuit M3. The processor M1 is electrically connected to the communication circuit M2, and the storage circuit M3 is electrically connected to the processor M1 and the communication circuit M2.

The synonym generator g is configured to generate a synonym according to a digest corresponding to an absent client device. In an embodiment, the synonym generator g is a software running on the processor M1, however, the present disclosure does not limit the hardware configured to execute the synonym generator g. The synonym generator g may be stored in the storage circuit M3 or an internal memory of the processor M1. The detail of the synonym generator g is described later when the encoder ε is described.

The processor M1 is configured to determine the absent client device among the plurality of client devices Ci, Cj. In an embodiment, the processor M1 checks the connection between the communication circuit M2 and each of the plurality of client devices Ci, Cj and thereby determining whether one or more of the client devices Ci, Cj is (are) disconnected and being the absent client device(s). The processor M1 is further configured to initialize a general model, train a replacement model according to the synonym and the digest corresponding to the absent client device, and perform an aggregation to generate an updated parameter to update the general model according to a replacement parameter of the replacement model and the client parameter of each of the plurality of client devices except the absent client device. In an embodiment, the replacement parameter, the client parameter, and the updated parameter are gradients of the neural network model corresponding to these parameters, respectively. Specifically, the replacement parameter is the gradient of the replacement model, the updated parameter is associated with the weights of the client model, such as the gradient of the client model, and the updated parameter is the gradient of the general model. In an embodiment, the aggregation may adopt the FedAvg algorithm. In other embodiments, the aggregation may adopt the FedProx algorithm or the FedNora algorithm.

The federated learning system using synonym (which may be called FedSyn) proposed by the present disclosure aims to jointly train the synonym generator g together with the training of the general model. In an embodiment, the processor M1 is in charge of training the general model and the synonym generator g. In an embodiment, since the synonym generator g can synthesize synonyms from the digests, the synonym generator g should be protected to avoid undesired access from any client devices Ci, Cj to avoid potential data leak or adversarial attacks. For example, the access limitation may be implemented by using the account type or the key of the client device Ci.

The communication circuit M2 is configured to send the general model to each of the plurality of client devices Ci, Cj. The storage circuit M3 is configured to store the digests, the synonyms, the general model, and the replacement model sent from all of the client devices Ci, Cj to the moderator Mo. In an embodiment, the storage circuit M3 is further configured to store the encoder ε.

The hardware architecture of each of the client devices Ci, Cj is basically the same, and the client device Ci in FIG. 1 is used as an example for illustration here. The client device Ci includes a processor i1, a communication circuit i2, and a storage circuit i3. The processor i1 is electrically connected to the encoder ε and the communication circuit i2. The storage circuit i3 is electrically connected to the processor i1 and the communication circuit i2.

The encoder ε is configured to remove a private portion of the private data and encode the private data into the digest. The present disclosure does not limit the type of the private data. For example, the private data is an integrated circuit diagram, and the private portion is a key design in integrated circuit diagram. For example, the private data is a product design layout, and the private portion is the product logo. When the private data is an image, the encoder ε is, for example, an image processing tool providing a function of cropping out the private portion. When the private data is a text recording personal identity information, the encoder ε is configured to convert the original data, such as decreasing the dimension of data or masking specific strings. It should be noticed than the encoder ε should not perturb the data excessively, such as adding excessive noise, and making the data unusable. In an embodiment, the encoder ε proposed by the present disclosure may be implemented by an encoder of the autoencoder. In an embodiment, the dimension of synonym is equal to the dimension of private data. In addition, in an embodiment, the aforementioned communication circuit M2 is further configured to send the encoder ε to each of the plurality of client devices Ci, Cj. In other words, the moderator Mo and each of the plurality of client devices Ci, Cj have the same encoder ε. In an embodiment, the encoder ε is a software running on the processor i1, however, the present disclosure does not limit the hardware configured to execute the encoder ε. The encoder ε may be stored in the storage circuit i3 or an internal memory of the processor i1.

The processor i1 or j1 (the first processor) is configured to train the client model according to the private data, the digest and the general model. In an embodiment, one of the following devices may be employed as the processor i1 or j1: Application Specific Integrated Circuit (ASIC), Digital Signal Processor (DSP), Field Programmable Gate Array (FPGA), system-on-a-chip (SoC), and deep learning accelerator. One of the above devices may be employed as the processor M1 (the second processor) of the moderator Mo.

The communication circuit i2 or j2 (the first communication circuit) is configured to transmit (send) the digest and the client parameter to the moderator Mo. In an embodiment, the communication circuit i2 or j2 may adopt wired network or wireless network. The network type of the communication circuit M2 (the second communication circuit) of the moderator Mo is identical to that of the communication circuit i2 or j2.

The storage circuit i3 or j3 is configured to store the private data, the digest, the general model and the client model. In an embodiment, one of the following devices may be employed as the storage circuit i3 or j3: Dynamic Random Access Memory (DRAM), Static Random Access Memory (SRAM), Double Data Rate Synchronous Dynamic Random Access Memory (DDR SDRAM), flash memory, and hard disk. One of the above devices may be employed as the storage circuit M3 of the moderator Mo.

Figure 2:
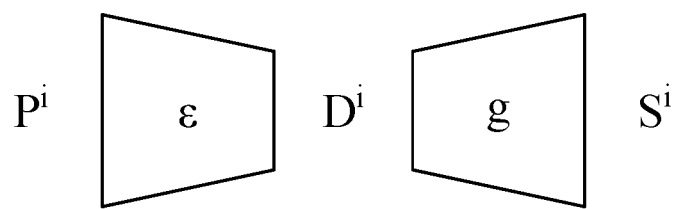
FIG. 2 is a schematic diagram of the relation of the private data, the digest, and the synonym according to an embodiment of the present disclosure.

Please refer to FIG. 2. FIG. 2 is a schematic diagram of the relation of the private data, the digest, and the synonym according to an embodiment of the present disclosure, and uses the client device Ci as an example. As shown in FIG. 2, the encoder ε takes the private data $p^i$ of client device Ci as the input and outputs the digest $D^i$. The synonym generator g takes the digest $D^i$ as the input and outputs the synonym $S^i$. This way, the digests can be shared or stored outside the client device Ci for FL training. The use of digests and synonyms is versatile and adaptable to most existing architectures to perform FL training in various applications.

Figure 3:
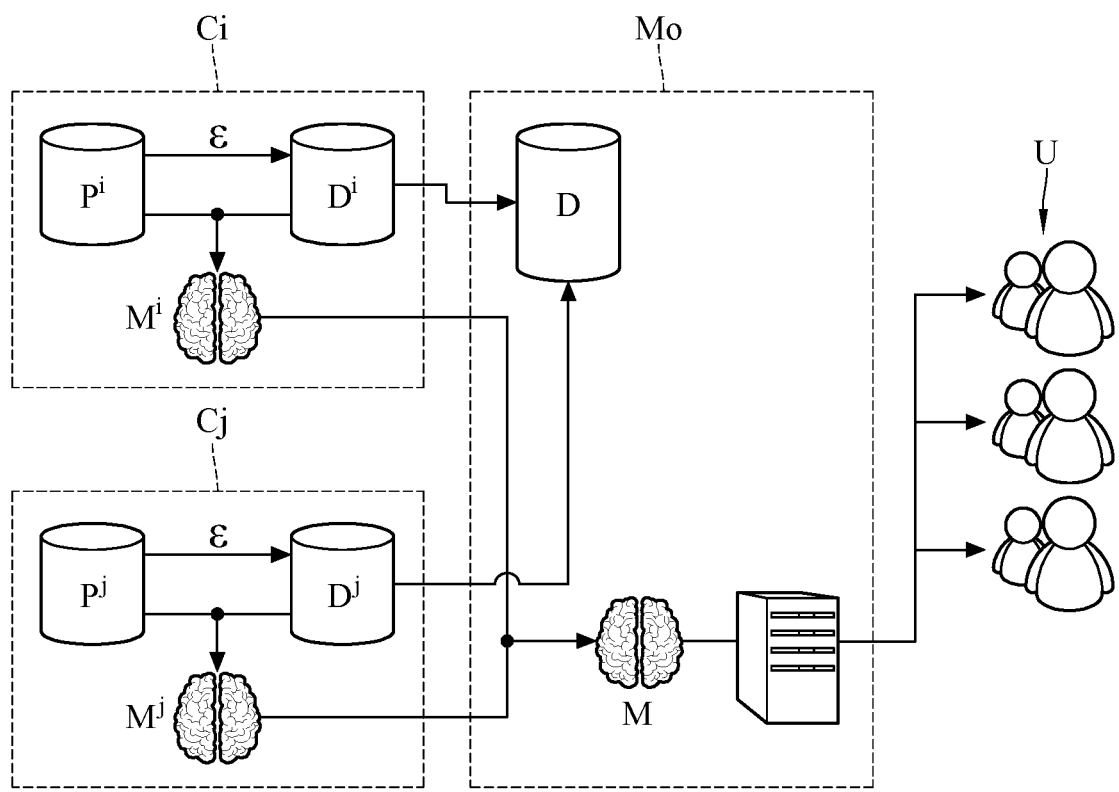
FIG. 3 and FIG. 4 are overview diagrams of the federated learning system using synonym according to an embodiment of the present disclosure.
Figure 4:
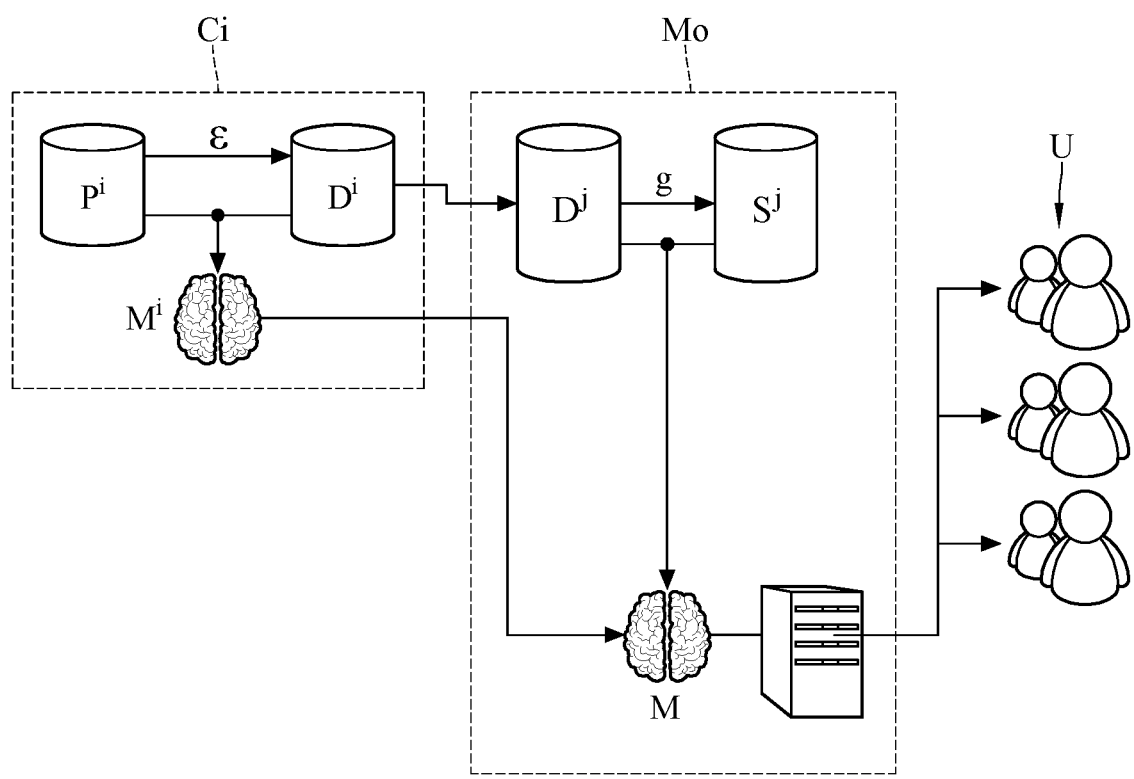

FIG. 3 and FIG. 4 are overview diagrams of the federated learning system using synonym according to an embodiment of the present disclosure. FIG. 3 and FIG. 4 represent two different timings in the training process respectively. The timing corresponding to FIG. 4 is later than the timing corresponding to FIG. 3.

The client devices Ci, Cj exist and perform the training tasks respectively at the timing corresponding to FIG. 3.

The encoder ε encodes the private data $P^i$ into the digest $D^i$, and then sends the digest $D^i$ to the moderator Mo. The client device Ci trains the client model $M^i$ according to the private data $P^i$, the digest $D^i$, and the general model M. It should be noted that the client device Ci has already received the general model M from the moderator Mo before the timing corresponding to FIG. 3.

The encoder ε encodes the private data $P^j$ into the digest $D^j$, and then sends the digest $D^j$ to the moderator Mo. The client device Cj trains the client model $M^j$ according to the private data $P^j$, the digest $D^j$, and the general model M. It should be noted that the client device Cj has already received the general model M from the moderator Mo before the timing corresponding to FIG. 3.

The moderator Mo receives the digests $D^i$, $D^j$ from the client devices Ci, Cj and store thereof. The moderator Mo receives the client parameters of the client models $M^i$, $M^j$ from the client devices Ci, Cj, and performs the aggregation according to these client parameters to generate the updated parameters for updating the general model M. Finally, the well-trained general model may be deployed on the consumer's device U and being used.

At the timing corresponding to FIG. 4, the client device Ci exists and operates in the same way as described in FIG. 3. However, the client device Cj leaves and becomes the absent client device. To prevent the accuracy of the general model M being affected by the absent client device Cj, the synonym generator g of the moderator Mo generates the synonym $S^j$ according to the digest $D^j$ corresponding to the absent client device Cj, the moderator Mo further trains the replacement model according to the synonym $S^j$ and the digest $D^i$ corresponding to the absent client device Cj, and performs the aggregation to generate the updated parameter to update the general model M according to the replacement parameter of the replacement model and the client parameter of each of the plurality of client devices Ci except the absent client device Cj.

As shown in FIG. 3 and FIG. 4, the above embodiment deals with potential client absence during FL training by encoding the private data $P^i$, $P^j$ of each of client devices Ci, Cj into digests $D^i$, $D^j$. When client device Cj leaves, the moderator Mo generates the synonym $S^j$ to represent the private data $P^j$ from the stored digest $D^j$ to continue training.

Each of the client devices Ci, Cj in the proposed federated learning system using synonym creates digests locally by encoding private training samples, the digests are transmitted and stored at the moderator Mo, so the FL training can continue even if the client devices are absent afterwards.

Figure 5:
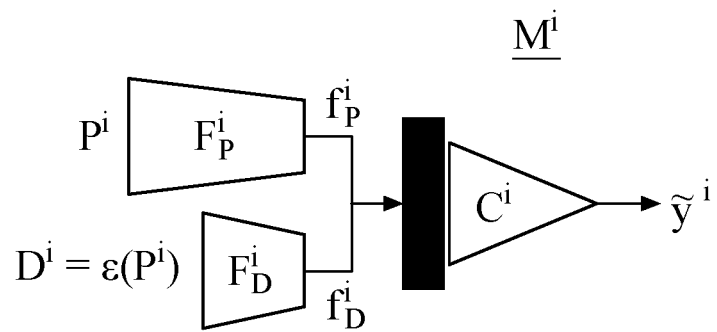
FIG. 5 is an internal architecture diagram of the client model according to an embodiment of the present disclosure.
Figure 6:
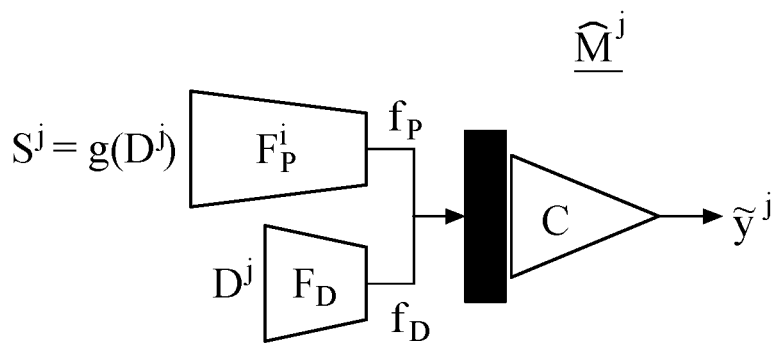
FIG. 6 is an internal architecture of the replacement model according to an embodiment of the present disclosure.

Please refer to FIG. 4, FIG. 5, and FIG. 6. FIG. 5 is an internal architecture diagram of the client model according to an embodiment of the present disclosure, and takes the client model $M^i$ of the client device Ci as an example. FIG. 6 is an internal architecture of the replacement model according to an embodiment of the present disclosure, and takes the replacement model corresponding to the absent client device Cj as an example.

As shown in FIG. 5, the client model $M^i$ of the client device Ci includes a first feature extractor $F_P^i$, a second feature extractor $F_D^i$, and a classifier $C^i$. The first feature extractor $F_P^i$ takes the private data $P^i$ as the input and outputs a first feature $f_P^i$. The second feature extractor $F_D^i$ takes the digest $D^i$ as the input and outputs the second feature $f_D^i$. The classifier Ci takes a concatenation of the first feature $f_P^i$ and the second feature $f_D^i$ as the input and outputs the predicted result $\hat{y}^i$.

As shown in FIG. 6, the replacement model $\hat{M}^j$ of the moderator Mo includes a first feature extractor $F_P$, a second feature extractor $F_D$, and a classifier C. The first feature extractor $F_P$ takes the synonym $S^j$ as the input and outputs a first feature $f_P$. The second feature extractor $F_D$ takes the digest $D^j$ as the input and outputs the second feature $f_D$. The classifier C takes a concatenation of the first feature $f_P$ and the second feature $F_D$ as the input and outputs the predicted result $\hat{y}^j$.

As shown in FIG. 5 and FIG. 6, the replacement model $\hat{M}^j$ and the client model $M^i$ have the same structure. This structure includes two feature extractors and one classifier whereas the two models use different data access. The moderator Mo cannot access the private data $P^i$, but can access the digest $D^i$. Therefore, the synonym generator g may be used to generate the synonym $S^j$ to continue training.

In general FL, client model training takes places at each client device, and client parameters (e.g. gradient) of the client device are transmitted to the moderator and then aggregated to update the general model. In the federated learning system using synonym, when the client device Ci is available, the client model $M^i$ is trained using the private data $P^i$ together with its digest $D^i$, as shown in FIG. 5. The client parameters corresponding to the client model are sent to the moderator Mo, the client parameters corresponding to all client devices Ci, Cj are aggregated to generate the updated parameter for updating the general model M, where the client parameters that should be provided by the absent client device (the client device Cj is taken as the example) are provided by the replacement model $\hat{M}^j$ generated by the moderator Mo, as shown in FIG. 6.

The federated learning system using synonym enforces identical structures for the replacement model $\hat{M}^j$ and the client model $M^i$, with one of differences being data accessing. When the client device Cj is available, its private data $P^j$ is used to generate the digest $D^j$ for training. Whenever the client device Cj becomes absent, the moderator Mo may take the digest $D^j$ and reconstruct the synonym $S^j$ for the absent client device Cj to continue training. This way, the training of the federated learning system using synonym is not interrupted whether the client device Cj is present or not.

Figure 7:
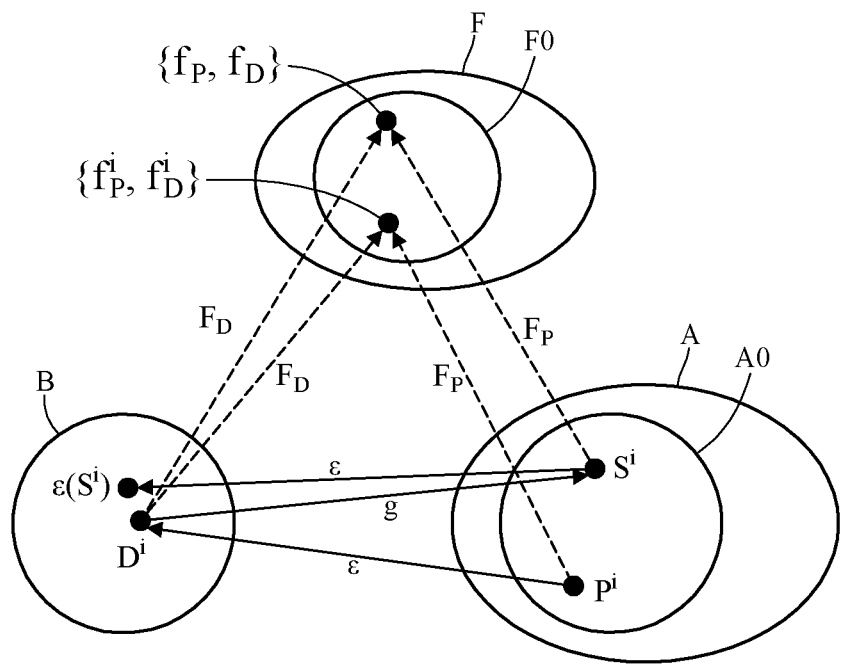
FIG. 7 is a schematic diagram showing spaces and projections of the private data, digest, synonym, and concatenation of features.

FIG. 7 is a schematic diagram showing spaces and projections of the private data, digest, synonym, and concatenation of features, and showing the encoder ε, synonym generator g and feature extractors $F_D$, $F_P$ performing projections in different spaces.

As shown in FIG. 7, the private data $P^i$ and synonym $S^i$ of all client devices Ci form the space A. In all the data in the space A, some data belonging to the same classification form the space A0. The space B is formed by encoding all the data in the space A by the encoder ε, including the private data $P^i$ and synonym $S^i$, where the private data $P^i$ locates on the client device Ci, the synonym $S^i$ locates on the moderator Mo and is generated by the synonym generator g according to the private data $P^i$.

The moderator Mo uses the first feature extractor $F_P$ to generate the first feature $f_P$, uses the second feature extractor $F_D$ to generate the second feature $f_D$. The concatenation $\{F_P, F_D\}$ of the first feature $F_P$ and the second feature $F_D$ forms the space F.

As shown in FIG. 7, the client device Ci uses the first feature extractor $F_P{}^i$ to extract the first feature $F_P{}^i$ from the private data $P^i$ in the space A and uses the second feature extractor $F_D{}^i$ to extract the second feature $f_D{}^i$ from the digest $D^i$ in the space B. The concatenation of these two features is denoted as $\{f_P{}^i, f_D{}^i\}$. The moderator Mo uses the first feature extractor $F_P$ to extract the first feature $f_P$ from the synonym $S^i$ in the space A0 and uses the second feature extractor $F_D$ to extract the second feature $f_D$ from the digest $D^i$ in the space B. The concatenation of these two features is denoted as $\{f_P, f_D\}$. All the concatenations form the space F. In the plurality of concatenations in the space F, those concatenations belonging to the same classification form the space F0. FIG. 7 shows that the client model trained by the client device Ci and the replacement model $\hat{M}^i$ trained by the moderator Mo generate the same classification results, despite using different training data. In other words, even the moderator Mo cannot obtain the private data $P^i$ of the client device Ci, and the client device Ci becomes the absent client device, the moderator Mo still can train the replacement model $\hat{M}^i$ according to the synonym $S^i$ and the digest $D^i$ and achieve the same training effect just like owning the private data $P^i$.

Figure 8:
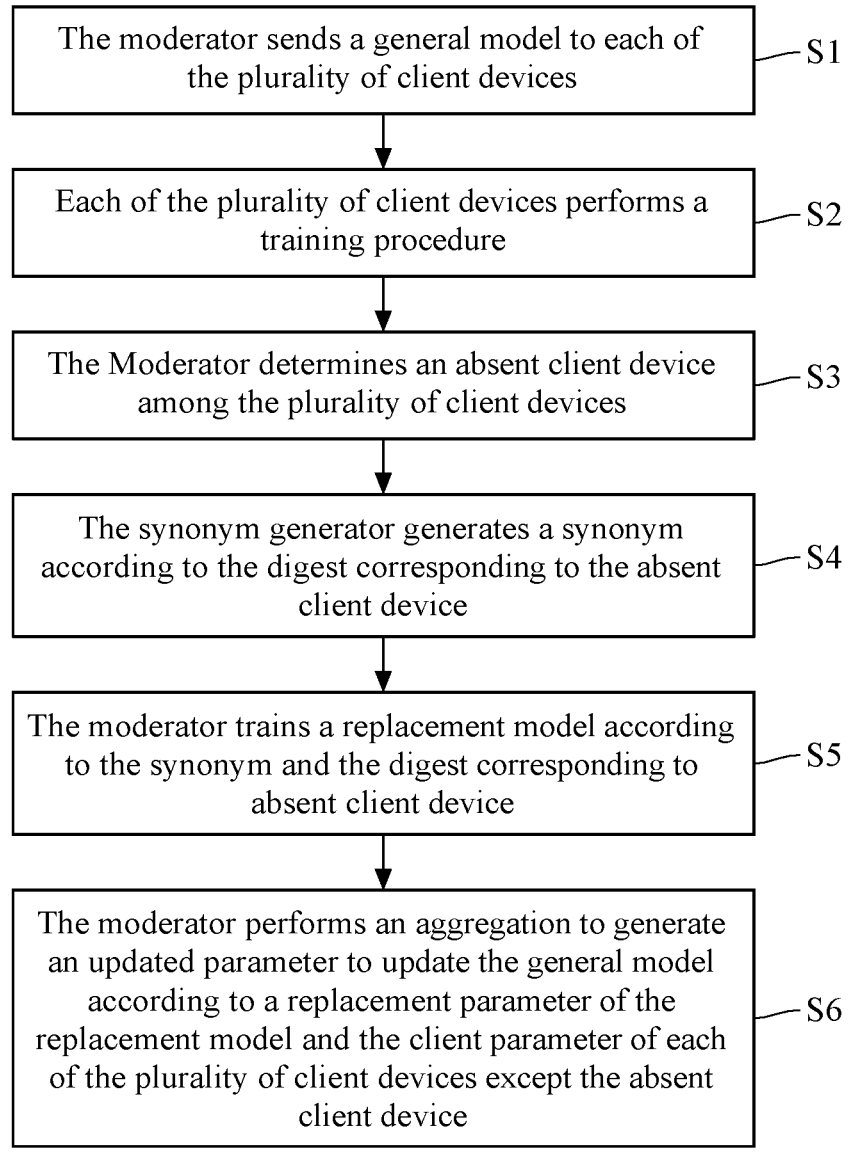
FIG. 8 is a flow chart of the federated learning method using synonym according to a first embodiment of the present disclosure.

FIG. 8 is a flow chart of the federated learning method using synonym according to a first embodiment of the present disclosure, with steps S1-S6. Step S1 represents "the moderator sends a general model to each of the plurality of client devices". Step S2 represents "each of the plurality of client devices performs a training procedure". Step S3 represents "the moderator determines an absent client device among the plurality of client devices". Step S4 represents "the synonym generator generates a synonym according to the digest corresponding to the absent client device". Step S5 represents "the moderator trains a replacement model according to the synonym and the digest corresponding to absent client device". Step S6 represents "the moderator performs an aggregation to generate an updated parameter to update the general model according to a replacement parameter of the replacement model and the client parameter of each of the plurality of client devices except the absent client device".

The proposed method in an embodiment of the present disclosure may be viewed as an extension of Federated Learning with the newly introduced designs of digests and synonyms together with new loss functions that update the synonym generator and help to retain model performance when trained with possibly absent client devices.

The FL training includes a plurality of iterations and FIG. 8 shows the detail of one of iterations. Please refer to FIG. 1 and FIG. 8. In an embodiment, the method shown in FIG. 8 may adopt the system shown in FIG. 1.

In step S1, the moderator Mo pushes the general model M to each of the plurality of client devices (denoted as "client device Ci" in the following paragraphs).

In an embodiment, step S1 further includes two steps to ensure that every client device Ci has the same encoder ε: the moderator Mo sends the encoder ε to every client device Ci, and the moderator Mo stores the encoder ε. The present disclosure fix the encoder ε to prevent the digest $D^i$ being dependent on the encoder ε, such that the digest $D^i$ is fixed in every training iteration.

Figure 9:
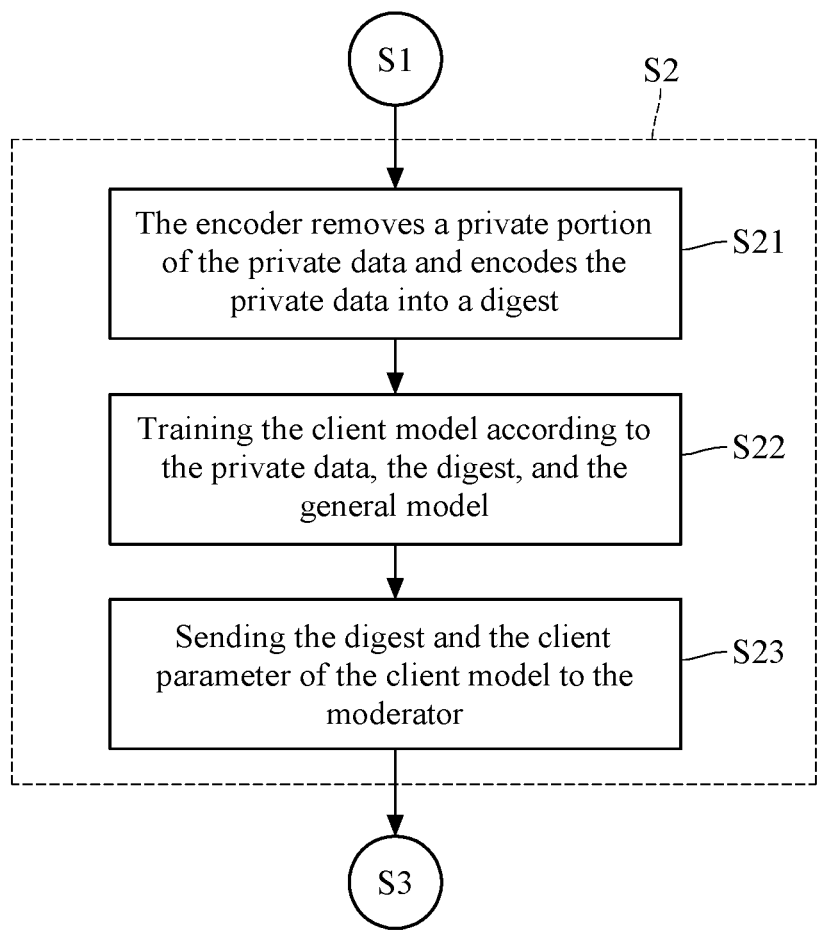
FIG. 9 is a detailed flow chart of a step in FIG. 8.

Regarding step S2, please refer to FIG. 9. FIG. 9 is a detailed flow chart of step S2 in FIG. 8, with steps S21-S23. Step S21 represents "the encoder removes a private portion of the private data and encodes the private data into a digest". Step S22 represents "training the client model according to the private data, the digest, and the general model". Step S23 represents "sending the digest and the client parameter of the client model to the moderator".

In step S2, as shown in step S21, each client device Ci encodes the private data $P^i$ into the digest $D^i$. As shown in step S22, the private data $P^i$ and the digest $D^i$ are served as the input data, and the client model $M^i$ is trained by SGD. As shown in step S23, the digest $D^i$ and the client parameter $VM^i$ are sent to the moderator Mo, and the digest $D^i$ only needs to be transmitted once at the beginning of training. However, if the private data $P^i$ was updated, the client device Ci has to generate a new digest $D^{i\prime}$ according to the updated private data $P^i$ and sends the new digest $D^{i\prime}$ to the moderator Mo.

Figure 10:
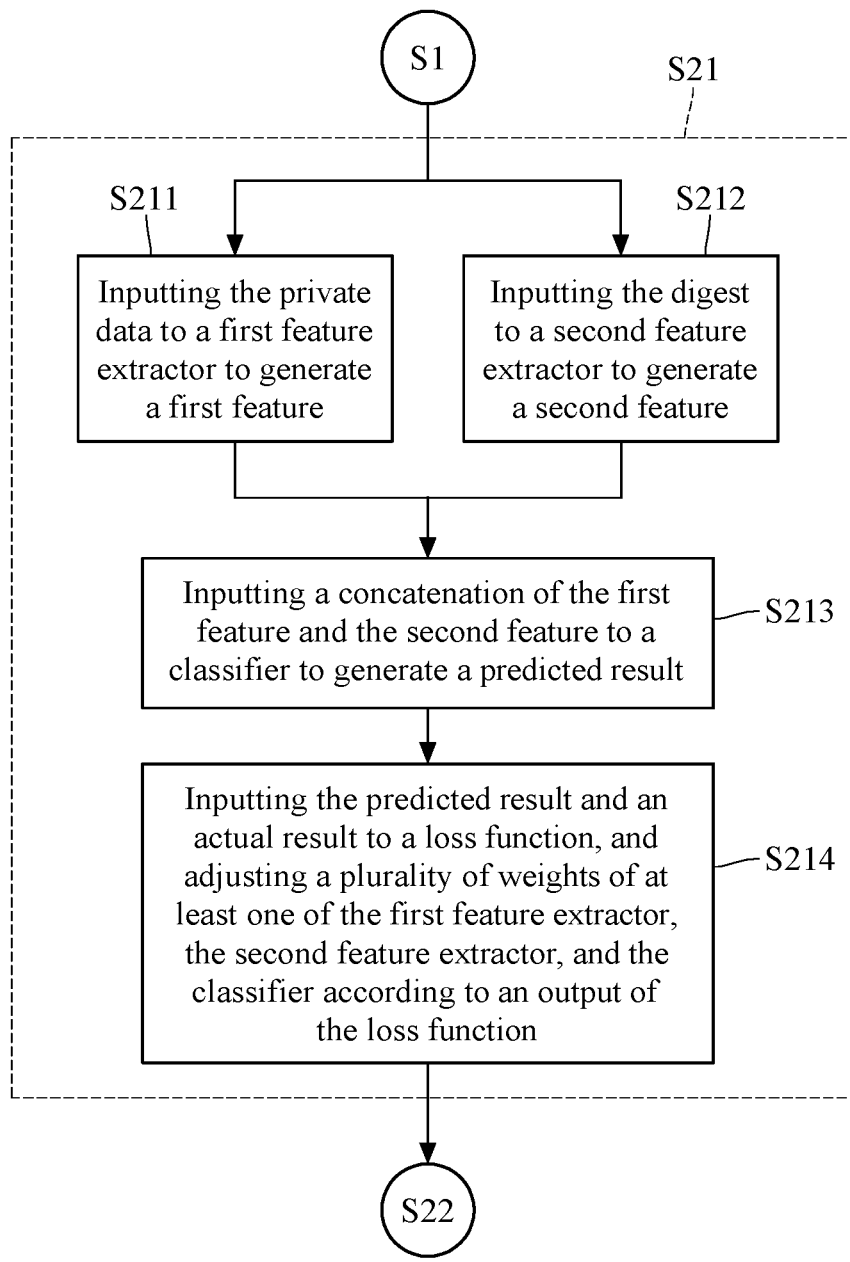
FIG. 10 is a detailed flow chart of a step in FIG. 9.

Regarding step S21, please refer to FIG. 5 and FIG. 10. FIG. 10 is a detailed flow chart of step S21 in FIG. 9, with steps S211-214. Step S211 represents "inputting the private data to a first feature extractor to generate a first feature". Step S212 represents "inputting the digest to a second feature extractor to generate a second feature". Step S213 represents "inputting a concatenation of the first feature and the second feature to a classifier to generate a predicted result". Step S214 represents "inputting the predicted result and an actual result to a loss function, and adjusting a plurality of weights of at least one of the first feature extractor, the second feature extractor, and the classifier according to an output of the loss function".

The implementation details of steps S211-S213 may refer to paragraphs regarding aforementioned FIG. 5. In an embodiment of step S214, in each client device Ci, the training data includes of the private data $P^i$ and the digest $D^i$ generated by the encoder ε. Each client device Ci trains the client model $M^i$ using the Client Classification Loss of the standard FedAvg algorithm, as Equation 1 shown below:

$$L_{client}=L_{CE}(M^i(P^i,D^i),y) \quad \text{(Equation 1)}$$

where $L_{CE}$ is the Cross Entropy Loss, $M^i(P^i, D^i)$ denotes the predicted result and y denotes the actual result.

In the process of steps S3-S6, the moderator Mo collects all of client parameters $\nabla M^i$ and determines if any client device Ci is absent. If the client device Cj is absent (due to purposely leaving or network congestion), the moderator Mo generates a replacement model $\hat{M}^j$ to calculate a replacement parameter $\nabla\hat{M}^j$ using the synonym $S^j$ generated from the digest $D^j$. The moderator Mo updates the general model M by aggregating $\nabla M^i$ and $\nabla\hat{M}^j$.

Figure 11:
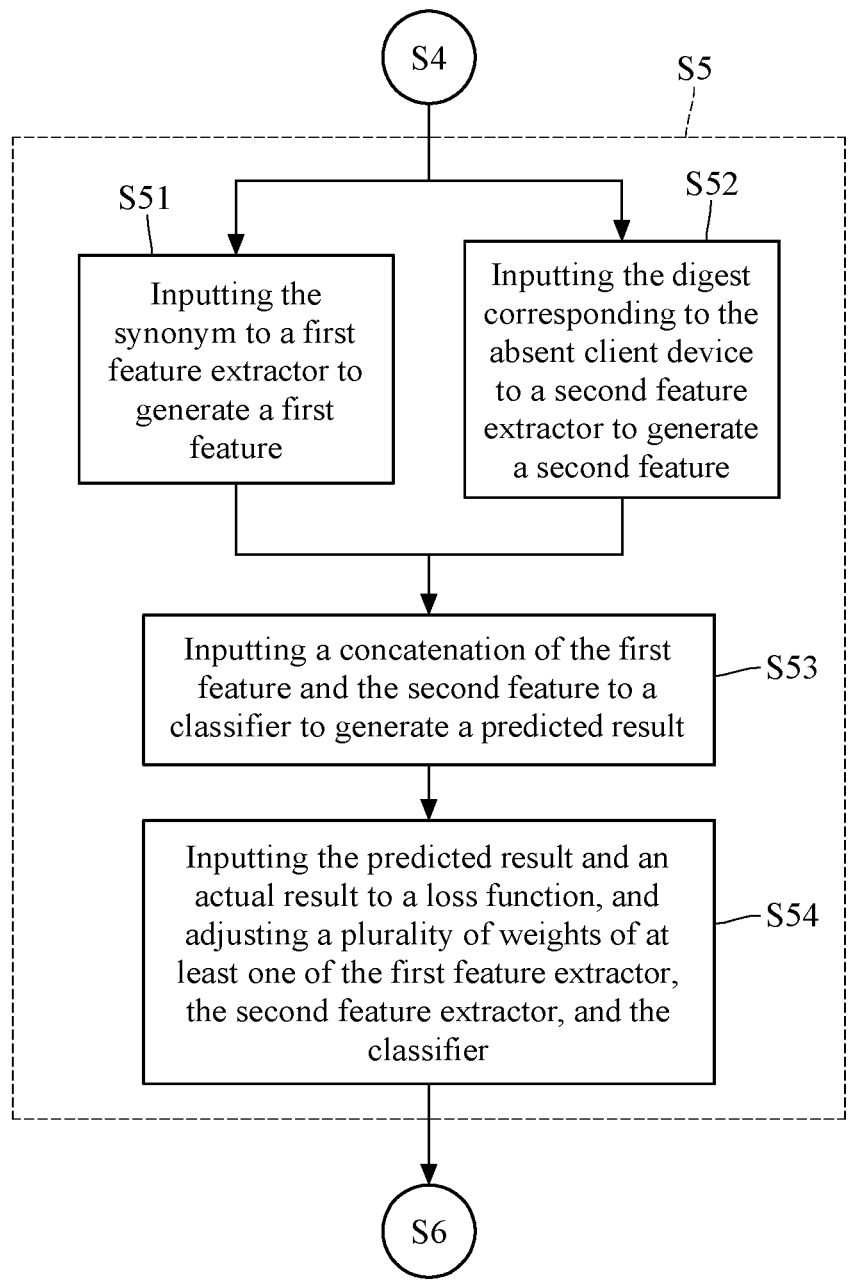
FIG. 11 is a detailed flow chart of a step in FIG. 8

Please refer to FIG. 5, FIG. 6 and FIG. 11. FIG. 11 is a detailed flow chart of step S5 in FIG. 8, with steps S51-S54. Step S51 represents "inputting the synonym to a first feature extractor to generate a first feature". Step S52 represents "inputting the digest corresponding to the absent client device to a second feature extractor to generate a second feature". Step S53 represents "inputting a concatenation of the first feature and the second feature to a classifier to generate a predicted result". Step S54 represents "inputting the predicted result and an actual result to a loss function, and adjusting a plurality of weights of at least one of the first feature extractor, the second feature extractor, and the classifier".

As shown in FIG. 5 and FIG. 6, the client model $M^i$ and the replacement model $\hat{M}^j$ have similar structure while the difference between two models is their input data. Therefore, the implementation details of steps S51-S53 may refer to paragraphs regarding FIG. 6 aforementioned. In an embodiment of step S54, the loss function is identical to the loss function used in step S214.

Figure 12:
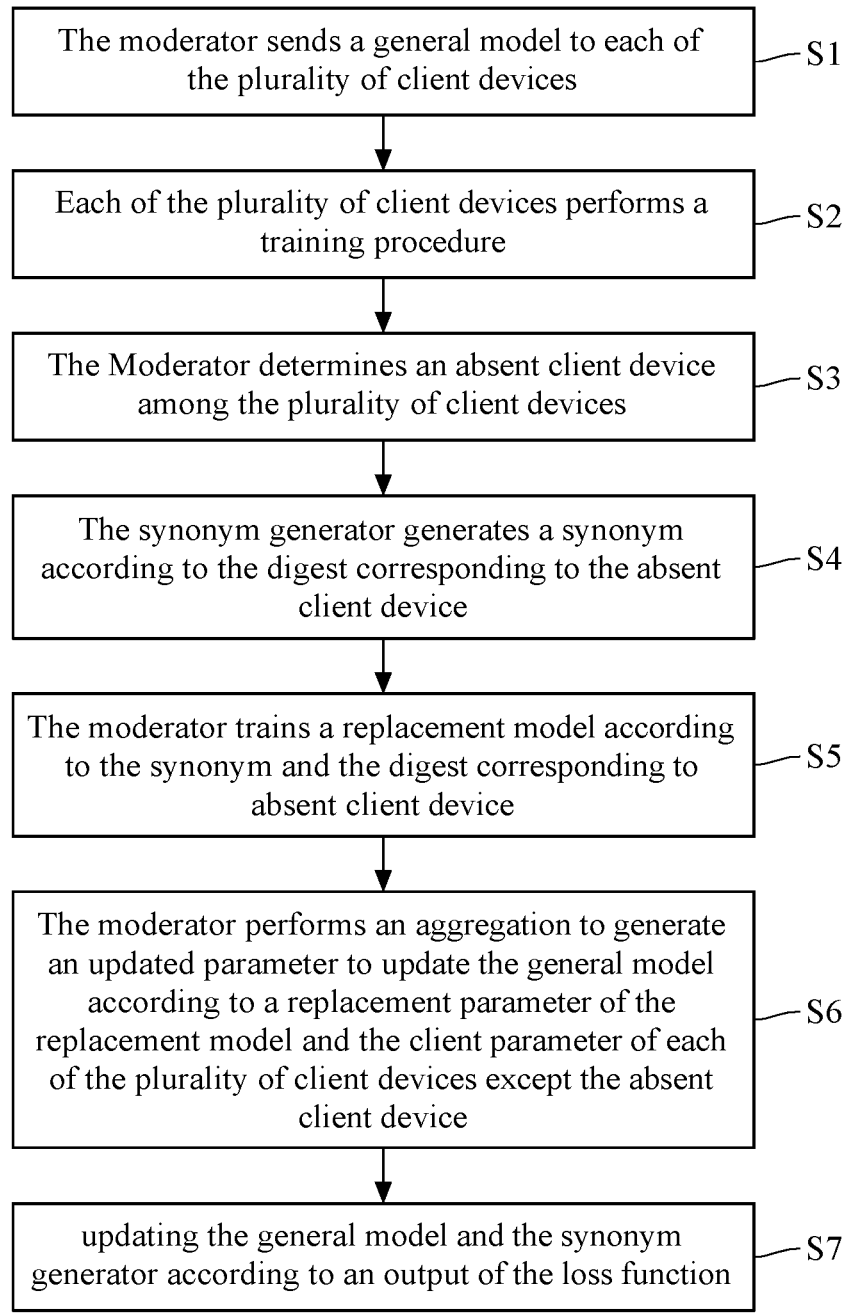
FIG. 12 is a flow chart of the federated learning method using synonym according to a second embodiment of the present disclosure.

FIG. 12 is a flow chart of the federated learning method using synonym according to a second embodiment of the present disclosure, where steps S1-S6 are identical to that of FIG. 10. Compared to the first embodiment, the second embodiment further includes step S7, "updating the general model and the synonym generator according to an output of the loss function".

Figure 13:
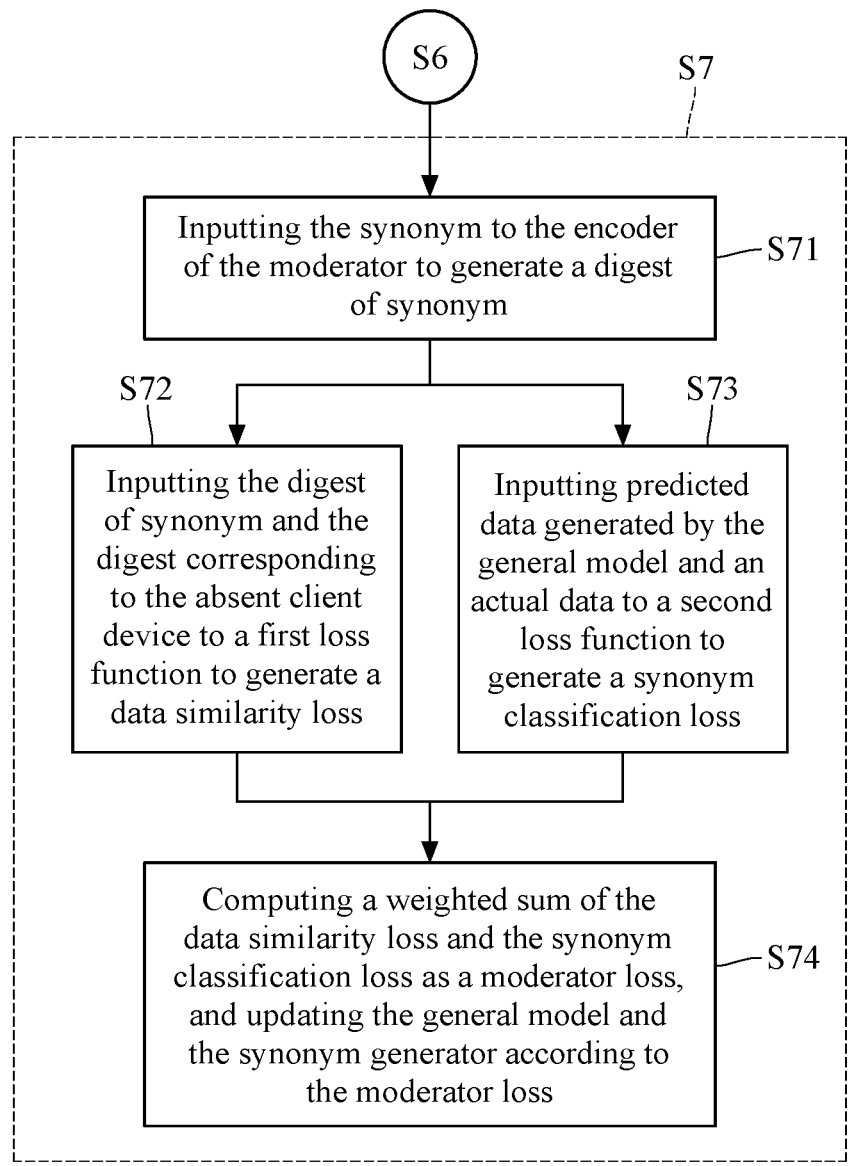
FIG. 13 is a detailed flow chart of a step in FIG. 12.
Figure 14:
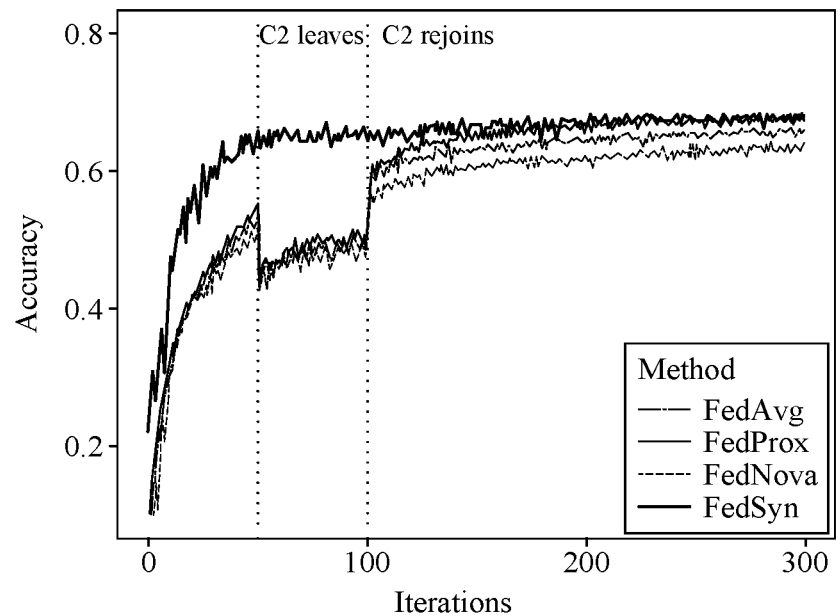
FIG. 14, FIG. 15, FIG. 16, and FIG. 17 show the accuracy of the general model in four training scenarios.
Figure 15:
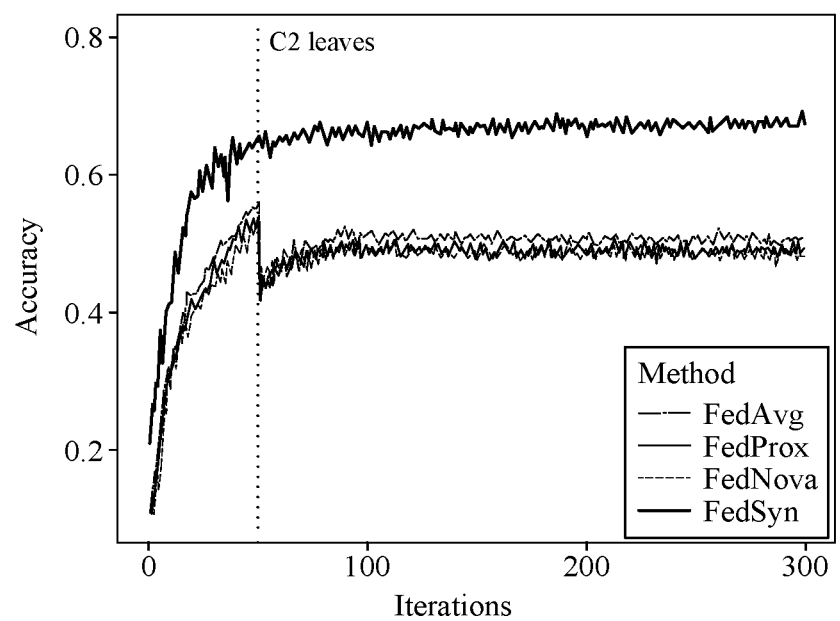
Figure 16:
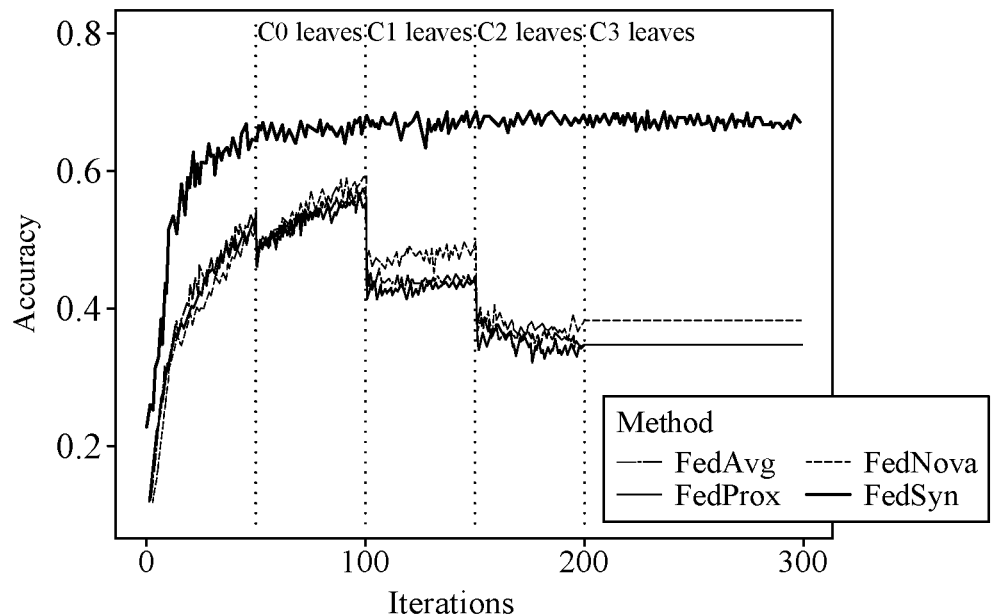
Figure 17:
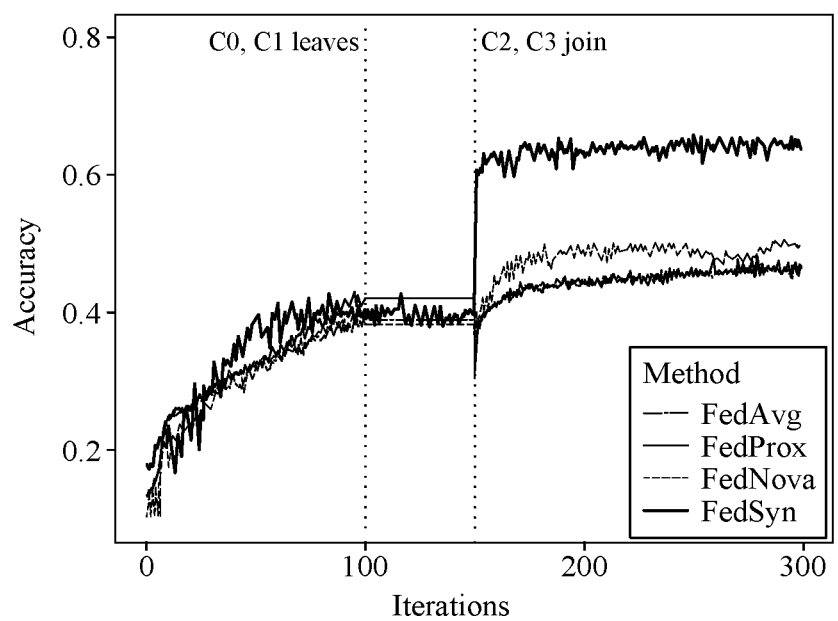

FIG. 13 is a detailed flow chart of step S7 in FIG. 12, with steps S71-S74. Step S71 represents "inputting the synonym to the encoder of the moderator to generate a digest of synonym". Step S72 represents "inputting the digest of synonym and the digest corresponding to the absent client device to a first loss function to generate a data similarity loss". Step S73 represents "inputting predicted data generated by the general model and an actual data to a second loss function to generate a synonym classification loss". Step S74 represents "computing a weighted sum of the data similarity loss and the synonym classification loss as a moderator loss, and updating the general model and the synonym generator according to the moderator loss".

In an embodiment of step S71, since the moderator Mo has already stored the encoder ε in step S1, the digest of synonym ε($S^i$) may be generated according to the synonym $S^i$.

In step S72, the Data Similarity Loss $L_{DSL}$ ensures that the projection of the private data $P^i$ and the projection of the synonym $S^i$ should be similar, as Equation 2 shown below:

$$L_{DSL}=L_{MSE}(\varepsilon(S),(D)) \quad \text{(Equation 2)}$$

where $L_{MSE}$ is Mean Square Error Loss, S and D denote all synonyms and digests owned by the moderator Mo, respectively. It should be noted that the synonym S is not generated only when there is an absent client device, but all the digests D collected by the moderator Mo will be used to generate corresponding synonyms S.

In step S73, the Synonym Classification Loss LSCL ensures that the synonyms $S^i$ and the digests Di should be classified well by the general model M, as Equation 3 shown below:

$$L_{SCL}=L_{CE}(M(S^i,D^i),y) \quad \text{(Equation 3)}$$

where $L_{CE}$ is the Cross Entropy Loss, y denotes the actual result. Since the synonym $S^i$ is generated by the synonym generator g, the convergences of $L_{SCL}$ and $L_{DSL}$ are equivalent to the implementation of the training of the synonym generator g.

In step S74, the weighted sum represents the moderator loss $L_{server}$ for jointly training the synonym generator S and the general model M, as Equation 4 shown below:

$$L_{server}=L_{DSL}+\lambda L_{SCL} \quad \text{(Equation 4)}$$

where λ is a balancing hyperparameter, which is set to λ=1 in an embodiment.

The present disclosure expects the general model M to learn from the synonyms Si generated by the synonym generator g. To achieve this goal, the present disclosure introduces an additional training process at the moderator Mo, as shown by the process of steps S71-S74.

The present disclosure introduces two concepts that advocate joint training of the general model M and the synonym generator g. Specifically, the present disclosure wants the general model M to learn: (1) how to best generate appropriate synonym $S^i$ and (2) how to best perform classification, i.e. determine the predicted result $\tilde{y}^i$ from the synonym $S^i$ and the digest $D^i$. The first concept aims to train the general model M so that it is capable of correctly classifying the information obtained from the digest $D^i$ and the synonym $S^i$. This concept is enforced by the two sets of arrows $F_P$ and $F_D$ in FIG. 7. The second concept it to make the digest of the synonym ε($S^i$) to resemble the digest of the private date $D^i$. This concept is enforced by the two sets of arrows ε in space A and space B in FIG. 7. The above two concepts are implemented by two loss functions proposed in step S72 and step S73.

The following algorithm shows the pseudo code of the federated learning method using synonym according to an embodiment of the present disclosure.

```
Initialize: M and g
for Each training iteration t (omit t) do
    Moderator pushed M to all clients
    for client i = 1, 2, ..., n in parallel do
        Update M^i with local data P^i with L_client
        Push ∇M^i to the moderator
    for absent client j = 1, 2, ..., k in parallel do at the moderator
        Update M̂^j with synonyms S^j with L_client
    Moderator aggregates ∇M^i and ∇M̂^j to update M
    Moderator updates M and g with loss L_server,
``` where M denotes the general model, g denotes the synonym generator, t denotes the number of times of iteration, $M^i$ denotes the client model of the client device Ci, $P_i$ denotes the private data of the client device Ci, $L_{client}$ denotes the Client Classification Loss, $\nabla M^i$ denotes the client parameter (gradient) of the client model $M^i$, $\hat{M}^j$ denotes the replacement model, $S^j$ denotes the synonym of the absent client device Cj, $\nabla\hat{M}^j$ denotes the replacement parameter (gradient) of the replacement model $\hat{M}^j$, and $L_{server}$ denotes the moderator loss.

In view of the above, the present disclosure proposes a federated learning method using synonym. This is a FL framework that can address client absence by synthesizing representative client data at the moderator. The present disclosure proposes a data memorizing mechanism to handle the client absence effectively. Specifically, the present disclosure handles the following three scenarios in combinations: (1) unreliable clients, (2) training after removing clients, and (3) training after adding clients.

During the FL training, there are four common training scenarios, (a) a client temporarily leaves during the FL training, (b) a client leaves the training forever, (c) all clients leave the FL training sequentially, and (d) multiple client groups join the FL training in different time slots. Please refer to FIG. 14, FIG. 15, FIG. 16, and FIG. 17. These four figures correspond to the above four scenarios respectively and show the accuracy of the general model, where C0, C1, C2 and C3 represent different client devices. The present disclosure forces the client that contains the largest amount of samples (such as C2) leaving the FL training to highlight the performance impact. As shown by FIGS. 14-17, none of the common FL algorithms, FedAvg, FedNova, FedProx, survive in the target four scenarios on the testing accuracy. On the other hand, the proposed FedSyn achieves a stable testing accuracy on the scenarios. The experiment results show the robustness of FedSyn proposed by the present disclosure.

What is claimed is:

1. A federated learning system using synonym, comprising:
   a plurality of client devices, wherein each of the plurality of client devices comprises:
   a first processor configured to execute an encoder, wherein the encoder removes a private portion of private data and encodes the private data after removing the private portion into a digest, and the first processor further trains a client model according to the private data after removing the private portion, the digest and a general model; and
   a first communication circuit electrically connected to the first processor, and configured to transmit the digest and a client parameter of the client model, wherein the client parameter is associated with a weight of the client model; and
   a moderator communicably connected to each of the plurality of client devices, wherein the moderator comprises:
   a second communication circuit configured to send the general model to each of the plurality of client devices; and
   a second processor electrically connected to the second communication circuit, and configured to determine an absent client device among the plurality of client devices and execute a synonym generator, wherein the synonym generator generates a synonym of the digest corresponding to the absent client device, the second processor further trains a replacement model according to the synonym and the digest corresponding to the absent client device, and performs an aggregation to generate an updated parameter to update the general model according to a replacement parameter of the replacement model and the client parameter of each of the plurality of client devices except the absent client device.

2. The federated learning system of claim 1, wherein the second communication circuit further sends the encoder to each of the plurality of the client devices and stores the encoder.

3. The federated learning system of claim 2, wherein:
   after the second processor updates the general model, the second processor further inputs the synonym to the encoder of the moderator to generate a digest of synonym, inputs the digest of synonym and the digest corresponding to the absent client device to a first loss function to generate a data similarity loss, inputs predicted data generated by the general model and an actual data to a second loss function to generate a synonym classification loss, computes a weighted sum of the data similarity loss and the synonym classification loss as a moderator loss, and updates the general model and the synonym generator according to the moderator loss.

4. The federated learning system of claim 3, wherein the first loss function is mean square error, and the second loss function is cross entropy.

5. The federated learning system of claim 1, wherein the first processor of each of the plurality of client devices further inputs the private data after removing the private portion to a first feature extractor to generate a first feature, inputs the digest to a second feature extractor to generate a second feature, inputs a concatenation of the first feature and the second feature to a classifier to generate a predicted result, inputs the predicted result and an actual result to a loss function, and adjusts a plurality of weights of at least one of the first feature extractor, the second feature extractor, and the classifier according to an output of the loss function.

6. The federated learning system of claim 5, wherein the loss function is cross entropy.

7. The federated learning system of claim 1, wherein the second processor trains the replacement model according to the synonym and the digest corresponding to the absent client device comprises:
   inputting the synonym to a first feature extractor to generate a first feature, inputting the digest corresponding to the absent client device to a second feature extractor to generate a second feature, inputting a concatenation of the first feature and the second feature to a classifier to generate a predicted result, inputting the predicted result and an actual result to a loss function, and adjusting a plurality of weights of at least one of the first feature extractor, the second feature extractor, and the classifier.

8. The federated learning system of claim 1, wherein a dimension of the synonym equals to a dimension of the private data after removing the private portion.

9. The federated learning system of claim 1, wherein each of the plurality of client devices adopts a stochastic gradient decent method to train the client model.

10. The federated learning system of claim 1, wherein the aggregation adopts a FedAvg algorithm, a FedProx algorithm, or a FedNora algorithm.

* * * * *